(12) United States Patent
Lim et al.

(10) Patent No.: US 10,898,404 B2
(45) Date of Patent: Jan. 26, 2021

(54) ARTIFICIAL MUSCLE

(71) Applicant: ELECTRONICS AND TELECOMMUNICATIONS RESEARCH INSTITUTE, Daejeon (KR)

(72) Inventors: Jeong Mook Lim, Daejeon (KR); Sung Ryul Yun, Daejeon (KR); Ki-Uk Kyung, Daejeon (KR); Seongcheol Mun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 528 days.

(21) Appl. No.: 15/898,154

(22) Filed: Feb. 15, 2018

(65) Prior Publication Data

US 2018/0263839 A1   Sep. 20, 2018

(30) Foreign Application Priority Data

Mar. 20, 2017 (KR) .................. 10-2017-0034918

(51) Int. Cl.
| | |
|---|---|
| *A61H 3/00* | (2006.01) |
| *F03G 7/00* | (2006.01) |
| *H02N 10/00* | (2006.01) |
| *B25J 9/10* | (2006.01) |
| *A61H 1/02* | (2006.01) |

(Continued)

(52) U.S. Cl.
CPC .............. *A61H 3/00* (2013.01); *A61H 1/02* (2013.01); *B25J 9/0006* (2013.01); *B25J 9/1075* (2013.01); *F03G 7/06* (2013.01); *A61H 2201/0207* (2013.01); *A61H 2201/0214* (2013.01); *A61H 2201/1207* (2013.01); *A61H 2201/5007* (2013.01); *A61H 2201/5053* (2013.01);

(Continued)

(58) Field of Classification Search
CPC .... A61H 3/00; A61H 1/02; A61H 2201/0207; A61H 2201/0214; A61H 2201/1207; A61H 2201/5007; A61H 2201/5053; A61H 2201/5061; A61H 2201/5071; B25J 9/0006; B25J 9/1075; F03G 7/06
USPC ................................................. 310/306, 307
See application file for complete search history.

(56) References Cited

U.S. PATENT DOCUMENTS

| | | | |
|---|---|---|---|
| 9,662,197 B2 | 5/2017 | Yun et al. | |
| 2012/0083820 A1* | 4/2012 | Carman | A61F 2/04 606/191 |

(Continued)

FOREIGN PATENT DOCUMENTS

| | | |
|---|---|---|
| KR | 101053196 B1 | 8/2011 |
| KR | 101172427 B1 | 8/2012 |

(Continued)

*Primary Examiner* — Thomas M Dougherty

(57) ABSTRACT

An artificial muscle includes a first stress transmission part and a second stress transmission part, which are spaced apart from each other in a first direction, a contraction coil spring provided between the first and second stress transmission parts to pull the first and second stress transmission parts, and an expansion part provided between the first and second stress transmission parts to push the first and second stress transmission parts. The contraction coil spring has a shape of a spring progressing in the first direction, and the contraction coil spring is contracted by heat.

12 Claims, 8 Drawing Sheets

(51) Int. Cl.
*B25J 9/00* (2006.01)
*F03G 7/06* (2006.01)

(52) U.S. Cl.
CPC ............... *A61H 2201/5061* (2013.01); *A61H 2201/5071* (2013.01)

(56) References Cited

U.S. PATENT DOCUMENTS

| | | |
|---|---|---|
| 2016/0206420 A1 | 7/2016 | Yun et al. |
| 2016/0216492 A1 | 7/2016 | Yun et al. |
| 2017/0309409 A1 | 10/2017 | Kim et al. |
| 2018/0289925 A1* | 10/2018 | Palmer .............. A61M 25/0133 |
| 2020/0088174 A1* | 3/2020 | Tawfick .................... A61F 2/00 |
| 2020/0107932 A1* | 4/2020 | Rabito .................. A61F 2/2454 |

FOREIGN PATENT DOCUMENTS

| | | |
|---|---|---|
| KR | 101183650 B1 | 9/2012 |
| KR | 101621167 B1 | 5/2016 |
| KR | 1020160088093 A | 7/2016 |
| KR | 101660116 B1 | 9/2016 |

* cited by examiner

ARTIFICIAL MUSCLE

CROSS-REFERENCE TO RELATED APPLICATIONS

This U.S. non-provisional patent application claims priority under 35 U.S.C. § 119 of Korean Patent Application No. 10-2017-0034918, filed on Mar. 20, 2017, the entire contents of which are hereby incorporated by reference.

BACKGROUND

The present disclosure herein relates to an artificial muscle, and more particularly, to an artificial muscle having an improved operation speed.

As the field of wearable electronic devices is developed, the need of an exercise assisting system of the wearable electronic device for assisting an exercise ability of a user has been increasing. Typically, an exo-skeleton muscular strength assisting system, which has a strong rigid-frame structure, is mainly used for a human exercise ability assisting system. In general, the exo-skeleton system includes a skeleton device made of a rigid material and serving as a skeleton of a human and a joint device for connecting a skeleton to another skeleton. The skeleton device and the joint device are arranged collinearly to a body structure and a rotation axis of a human to assist or replace an exercise ability of the human.

The exo-skeleton muscular strength assisting system has a feature in that it helps to strengthen an exercise function of a wearer. For example, the exo-skeleton muscular strength assisting system may provide a sufficiently strong force to a person who is degraded in exercise function due to aging or a worker who needs a stronger strength than one's strength. The exo-skeleton muscular strength assisting system may strengthen an exercise ability of the user or provide a suitable exercise function to a person who lost an exercise ability due to disability or accidents.

However, the exo-skeleton muscular strength assisting system has a limitation in realizing a light weight system due to the volume and weight thereof and is not comfortable to wear because a degree of freedom of a human body is mismatched with that of the exo-skeleton muscular strength assisting system. Also, the joint device is operated by rotation of an electric motor or a gear. When the electric motor is used, since a transmission mechanism and a reduction mechanism are necessary, noise is generated. The mismatch in the degree of freedom of joints and the limitation in volume and weight are direct causes on uncomfortable feeling of wearing. Although the wearable-type exo-skeleton muscular strength assisting system is excellent in mechanical performance, it is not widely used by ordinary people.

Researches on a soft muscular strength assisting system made of a flexible material is being actively carried out to resolve the limitations such as the uncomfortable feeling of wearing the exo-skeleton muscular strength assisting system.

SUMMARY

The present disclosure provides a flexible artificial muscle performing a contraction movement and a relaxation movement.

The present disclosure also provides an artificial muscle having a fast operation speed.

However, the present disclosure is not limited to the embodiments described above.

An embodiment of the inventive concept provides an artificial muscle including: a first stress transmission part and a second stress transmission part, which are spaced apart from each other in a first direction; a contraction coil spring provided between the first and second stress transmission parts to pull the first and second stress transmission parts; and an expansion part provided between the first and second stress transmission parts to push the first and second stress transmission parts. The contraction coil spring has a shape of a spring progressing in the first direction, and the contraction coil spring is contracted by heat.

In exemplary embodiments, the contraction coil spring may include: a polymer coil spring; and a heating part covering a surface of the polymer coil spring. The heating part may heat the polymer coil spring, and the polymer coil spring may be contracted in the first direction by the heating.

In exemplary embodiments, the contraction coil spring may further include an outer cover that is radially spaced apart from the heating part, and a space through which a refrigerant flows may be provided between the outer cover and the heating part.

In exemplary embodiments, the artificial muscle may further include a strain sensor provided between the first and second strain transmission parts, and the strain sensor may measure a variation amount of a distance between the first and second strain transmission parts.

In exemplary embodiments, the expansion part may include: a polymer layer surrounding the contraction coil spring; and a first electrode and a second electrode, which are respectively provided on an inner surface and an outer surface of the polymer layer. Voltages different from each other may be respectively applied to the first and second electrodes to provide an electric field in the polymer layer, and the polymer layer may be expanded in the first direction by the electric field.

In exemplary embodiments, the expansion part may further include a housing provided on the second electrode, and the housing may include an insulation material.

In exemplary embodiments, the expansion part may include: a polymer disk provided in a gap region of the contraction coil spring; and a third electrode and a fourth electrode, which are respectively provided on a top surface and a bottom surface of the polymer disk. The gap region may be a gap between a pair of wound wires disposed adjacent to each other of the contraction coil spring, voltages different from each other may be respectively applied to the third and fourth electrodes to provide an electric field in the polymer disk, and the polymer disk may be expanded in the first direction by the electric field.

In exemplary embodiments, each of the polymer disk and the gap region may be provided in plurality, the plurality of polymer disks may be respectively provided in the plurality of gap regions, and the plurality of polymer disks may be electrically connected to the third and fourth electrodes.

In exemplary embodiments, the expansion part may include an elastic coil spring having a shape of a spring progressing in the first direction, and the contraction coil spring may be provided in the elastic coil spring.

In exemplary embodiments, the elastic coil spring may be radially spaced apart from the contraction coil spring, and a space through which a refrigerant flows may be provided between the elastic coil spring and the contraction coil spring.

In exemplary embodiments, the elastic coil spring may cover a surface of the contraction coil spring.

In exemplary embodiments, the contraction coil spring may include a polymer coil spring, the elastic coil spring may heat the polymer coil spring, and the polymer coil spring may be contracted in the first direction by the heating.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
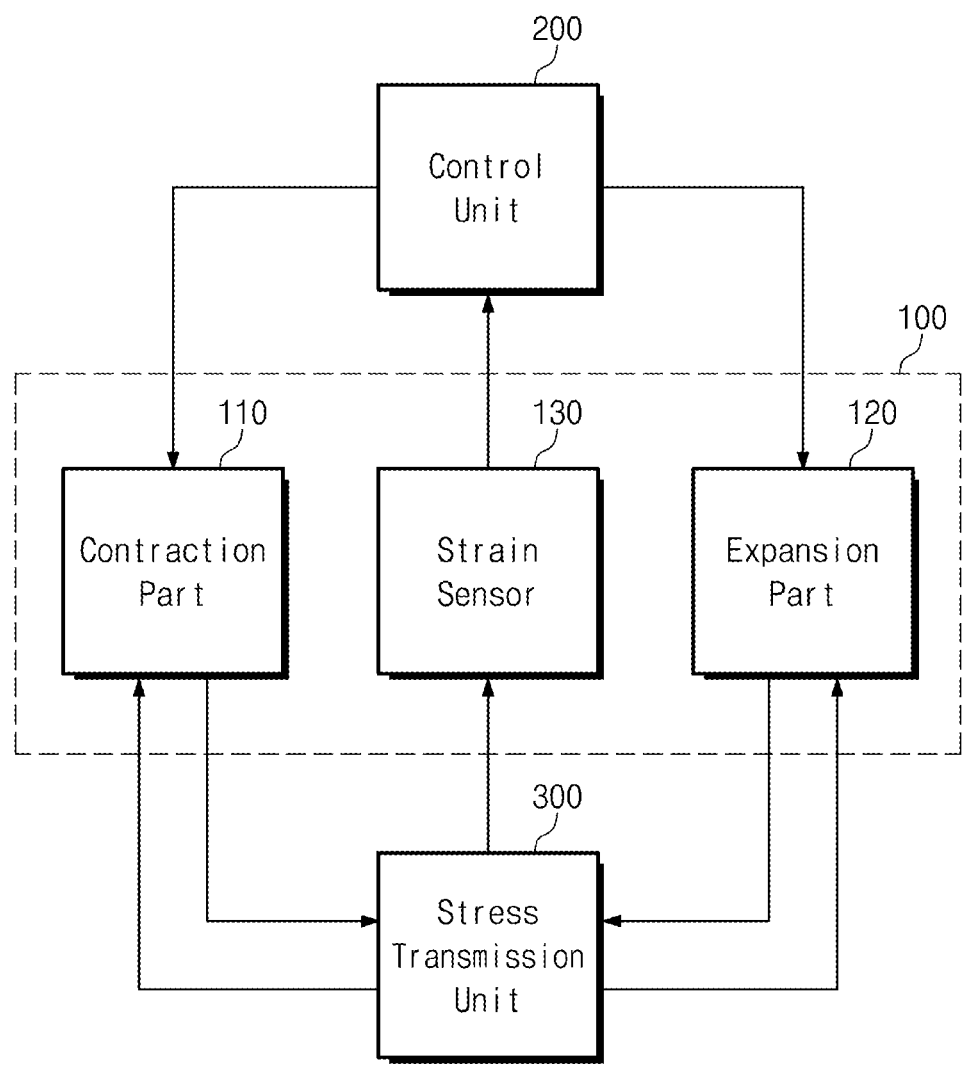
FIG. 1 is a block diagram of an artificial muscle according to exemplary embodiments of the inventive concept.

Exemplary embodiments of technical ideas of the inventive concept will be described with reference to the accompanying drawings so as to sufficiently understand constitutions and effects of the inventive concept. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. The embodiment in the detailed description will be described with cross-sectional views and/or plan views as ideal exemplary views of the inventive concept. In the figures, the dimensions of regions are exaggerated for effective description of the technical contents. Areas exemplified in the drawings have general properties, and are used to illustrate a specific shape of a semiconductor package region. Thus, this should not be construed as limited to the scope of the present invention. It will be understood that although the terms first and second are used herein to describe various elements, these elements should not be limited by these terms. These terms are only used to distinguish one component from another component. Embodiments described and exemplified herein include complementary embodiments thereof.

In the following description, the technical terms are used only for explaining a specific exemplary embodiment while not limiting the inventive concept. In this specification, the terms of a singular form may include plural forms unless specifically mentioned. The meaning of 'comprises' and/or 'comprising' does not exclude other components besides a mentioned component.

Hereinafter, the present invention will be described in detail by explaining preferred embodiments of the invention with reference to the attached drawings.

FIG. 1 is a block diagram of an artificial muscle according to embodiments of the inventive concept.

Referring to FIG. 1, an artificial muscle 10(12/14/16) including a body unit 100, a control unit 200, and a stress transmission unit 300 may be provided. The body unit 100 may include a contraction part 110, a strain sensor 130, and an expansion part 120. The contraction part 110 may contract the artificial muscle 10(12/14/16). For example, the contraction part 110 may contract the artificial muscle 10(12/14/16) by using thermal energy. The expansion part 120 may expand the artificial muscle 10(12/14/16). For example, the expansion part 120 may expand the artificial muscle 10(12/14/16) by using electric energy. The strain sensor 130 may detect a strain amount of the artificial muscle 10(12/14/16). For example, the strain sensor 130 may have an electric resistor that is varied according to the strain amount of the artificial muscle 10(12/14/16). The strain sensor 130 may generate data regarding a strain amount of the electric resistor to provide the data to the control unit 200.

The stress transmission unit 300 may transmit a force of the contraction part 110 to the entire artificial muscle 10(12/14/16). For example, when the contraction part 110 is contracted, the stress transmission unit 300 may transmit the contraction force to the strain sensor 130 and the expansion part 120. Accordingly, the strain sensor 130 and the expansion part 120 may be contracted. The stress transmission unit 300 may transmit a force of the expansion part 120 to the entire artificial muscle 10(12/14/16). For example, when the expansion part 120 is expanded, the stress transmission unit 300 may transmit the expansion force to the strain sensor 130 and the contraction part 110. Accordingly, the strain sensor 130 and the contraction part 110 may be expanded.

The control unit 200 may control the contraction part 110 and the expansion part 120 to contract and expand the contraction part 110 and the expansion part 120. The control unit 200 may receive data regarding a variation amount of the electric resistor from the strain sensor 130 to generate data regarding the strain amount of the artificial muscle 10(12/14/16). The control unit 200 may control a contraction amount of the contraction part 110 and an expansion amount of the expansion part 120 on the basis of the data regarding the strain amount.

Figure 2:
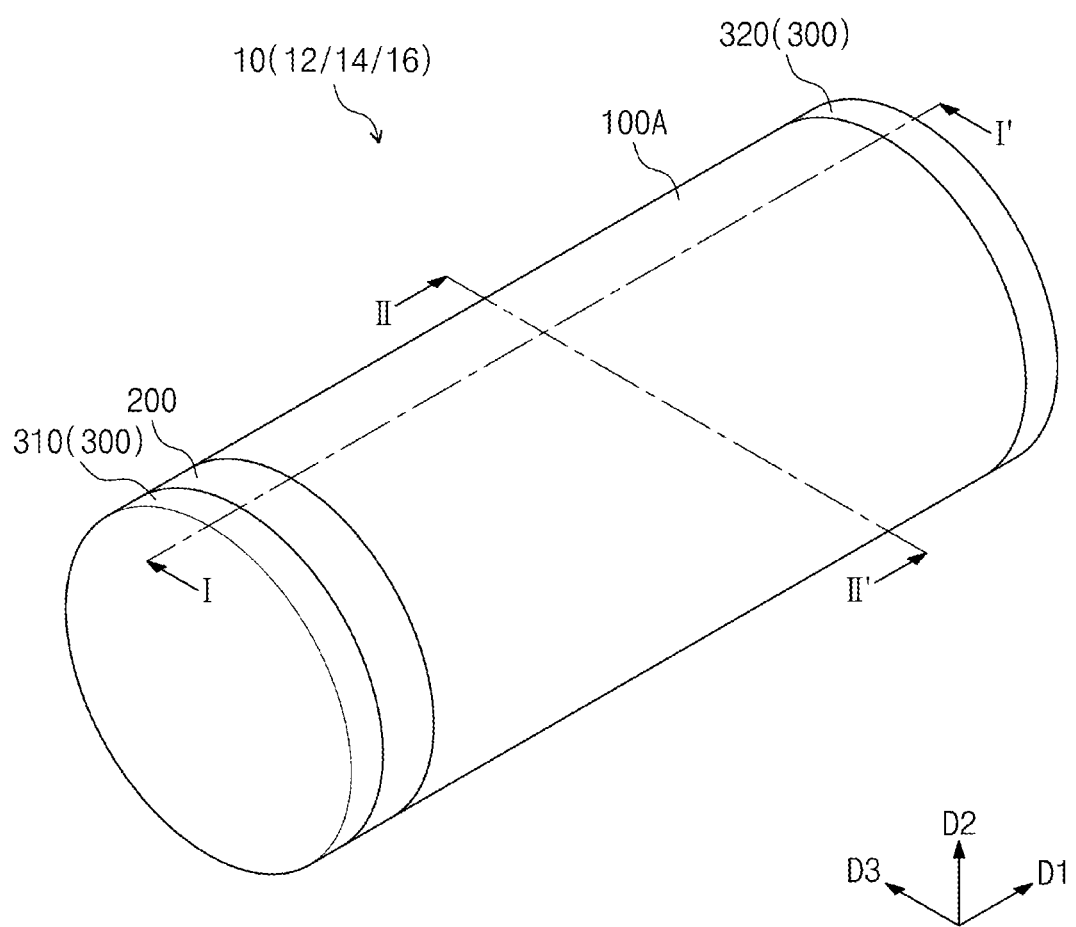
FIG. 2 is a perspective view of an artificial muscle according to exemplary embodiments of the inventive concept.
Figure 3:
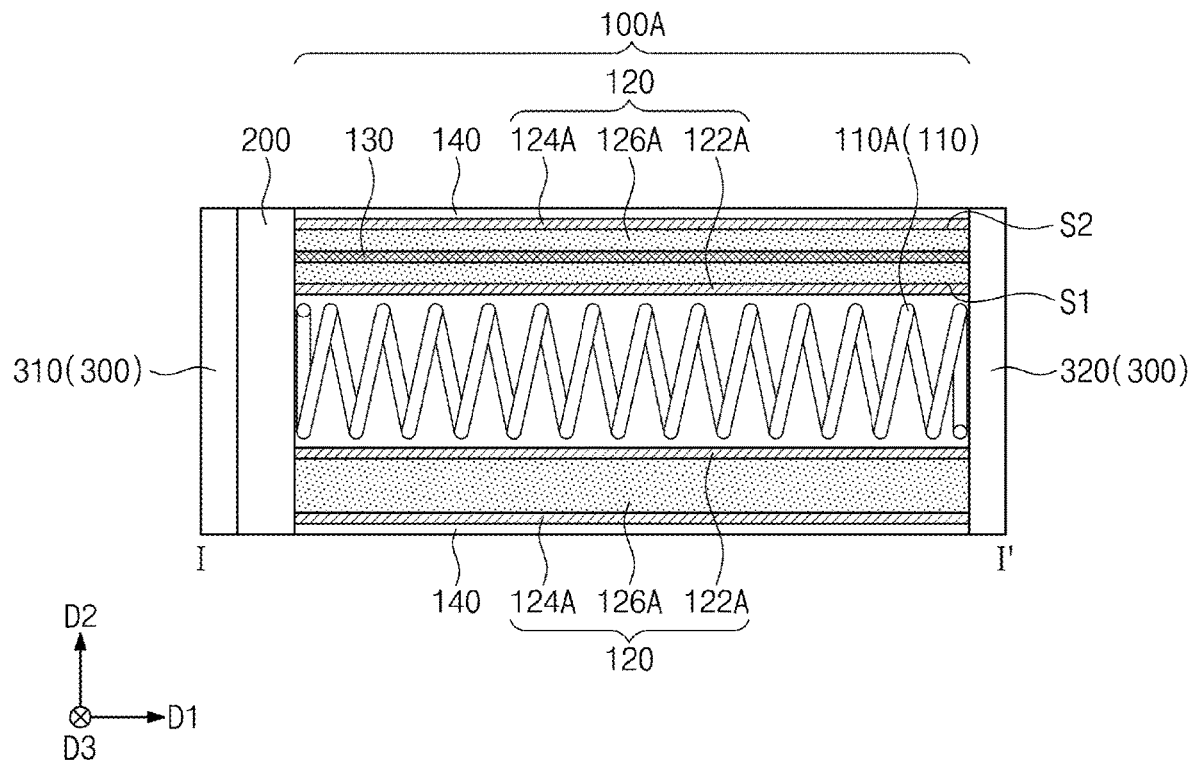
FIGS. 3 and 4 are cross-sectional views respectively taken along lines I-I' and II-II' of FIG. 2.
Figure 4:
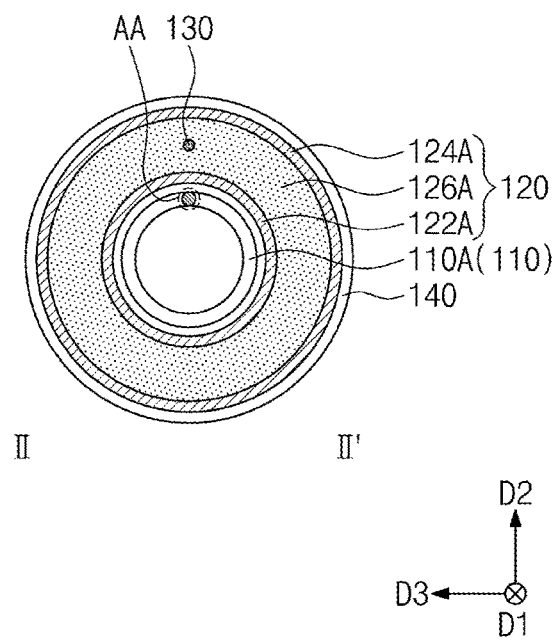
Figure 5:
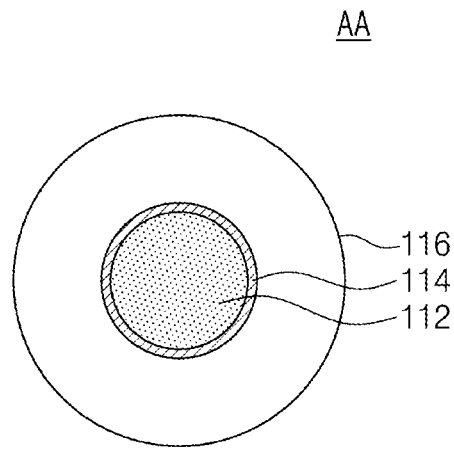
FIG. 5 is a cross-sectional view of a contraction coil spring of FIGS. 3 and 4.

FIG. 2 is a perspective view of an artificial muscle according to exemplary embodiments of the inventive concept. FIGS. 3 and 4 are cross-sectional views respectively taken along lines I-I' and II-II' of FIG. 2. FIG. 5 is a cross-sectional view of a contraction coil spring of FIGS. 3 and 4.

Referring to FIGS. 2 to 4, an artificial muscle 10 including a first body part 100A, a control unit 200, and a stress transmission unit 300 may be provided. The artificial muscle 10 may extend in a first direction D1. The first body part 100A, the control unit 200, and the stress transmission unit 300 may be arranged in the first direction D1. Although the artificial muscle 10 has a cylindrical shape, an embodiment of the inventive concept is not limited thereto.

The first body part 100A may include a first contraction coil spring 110A, an expansion part 120, a strain sensor 130, and a housing 140. The first contraction coil spring 110A may be disposed on a central portion of the first body part 100A. The first contraction coil spring 110A may have a shape of a spring progressing in the first direction D1.

Referring to FIG. 5, the first contraction coil spring 110A may include a polymer coil spring 112, a heating part 114 covering the polymer coil spring 112, and an outer cover 116 radially spaced apart from the heating part 114. A refrigerant (not shown) may be filled between the heating part 114 and the outer cover 116 or a flow area may be provided therebetween. Accordingly, the polymer coil spring 112 may include a polymer fiber that is contracted by heat. For example, the polymer coil spring 112 may include nylon or polyethylene. When the polymer coil spring 112 is heated, the polymer coil spring 112 may be contracted. When the polymer coil spring 112 is cooled, the polymer coil spring 112 may be relaxed to have an original length. The heating part 114 may heat the polymer coil spring 112. For example, when a current flows through the heating part 114, joule heat may be generated from the heating part 114, and the polymer coil spring 112 may be heated by the heat. The heating part 114 may include a material that is flexible and has low rigidity and high electric resistance. For example, the heating part 114 may include manganese dioxide ($MnO_2$). The outer cover 116 may include a material having flexibility and low rigidity. According to an embodiment of the inventive concept, the polymer coil spring 112 may be controlled in temperature by the heating part 114 to increase a speed of a contraction movement of the first contraction coil spring 110A.

Referring to FIGS. 3 and 4 again, the expansion part 120 may surround the first contraction coil spring 110A. The expansion part 120 may extend in the first direction D1. The expansion part 120 may include a polymer layer 126A and first and second electrodes 122A and 124A respectively covering an inner surface S1 and an outer surface S2 of the polymer layer 126A. The polymer layer 126A may include an electro-active polymer that is expanded by using an electric field. For example, when an electric field is provided in the polymer layer 126A, the polymer layer 126A may be expanded in a direction perpendicular to the electric field. Different voltages may be respectively applied to the first and second electrodes 122A and 124A to provide the electric field. For example, the electric field may be provided in a second direction D2 perpendicular to the first direction D1. The polymer layer 126A may be expanded in the first direction D1. The first electrode 122A may be the most adjacent to the first contraction coil spring 110A among components of the expansion part 120. The first electrode 122A and the first contraction coil spring 110A may face each other. The first and second electrodes 122A and 124A may include a conductive material (e.g., metal). According to an embodiment of the inventive concept, a voltage difference between the first and second electrodes 122A and 124A may be controlled to increase an expansion speed of the expansion part 120.

The strain sensor 130 may be inserted into the polymer layer 126A. The strain sensor 130 may extend in the first direction D1. The strain sensor 130 may have a length in the first direction D1, which is substantially the same as that of the polymer layer 126A in the first direction D1. When the length of the polymer layer 126A is varied, the length of the strain sensor 130 may be varied in the same manner. According to exemplary embodiments, when the strain sensor 130 decreases or increases in length, the strain sensor 130 may decrease or increase in electric resistance. Since the length of the strain sensor 130 is varied in the substantially same manner as that of the artificial muscle 10, when the artificial muscle 10 is contracted or expanded, the strain sensor 130 may decrease or increase in electric resistance. Data regarding a variation amount of the electric resistance may be provided to the control unit 200. The control unit 200 may receive the data regarding the variation amount of the electric resistance to generate data regarding a variation amount of the artificial muscle 10.

The housing 140 may be provided on the second electrode 124A. The housing 140 may include a flexible electric insulation material. According to an embodiment of the inventive concept, a user (not shown) of the artificial muscle 10 may not electrically contact the second electrode in virtue of the housing 140.

The strain transmission unit may include a first stress transmission part 310 and a second stress transmission part 320. The first and second stress transmission parts 310 and 320 may be spaced apart from each other with the first body part 100A therebetween in the first direction D1. According to an embodiment of the inventive concept, when the contraction part 110 pulls the first and second stress transmission parts 310 and 320, the first and second stress transmission parts 310 and 320 may push the expansion part 120. Accordingly, the expansion part 120 may be contracted. When the expansion part 120 pushes the first and second stress transmission parts 310 and 320, the first and second stress transmission parts 310 and 320 may pull the contraction part 110. Accordingly, the contraction part 110 may be expanded.

The control unit 200 may be provided between the first stress transmission part 310 and the first body part 100A. The control unit 200 may provide a pulling force of the contraction part 110 to the first stress transmission part 310. The control unit 200 may provide a pushing force of the expansion part 120 to the first stress transmission part 310. The control unit 200 may be substantially the same as the control unit 200 described with reference to FIG. 1.

According to an embodiment of the inventive concept, the artificial muscle, in which characteristics of the contraction speed of the first contraction coil spring 110A and characteristics of the expansion speed of the expansion part 120 are improved, may be provided.

Hereinafter, a method for operating an artificial muscle will be described.

Figure 6:
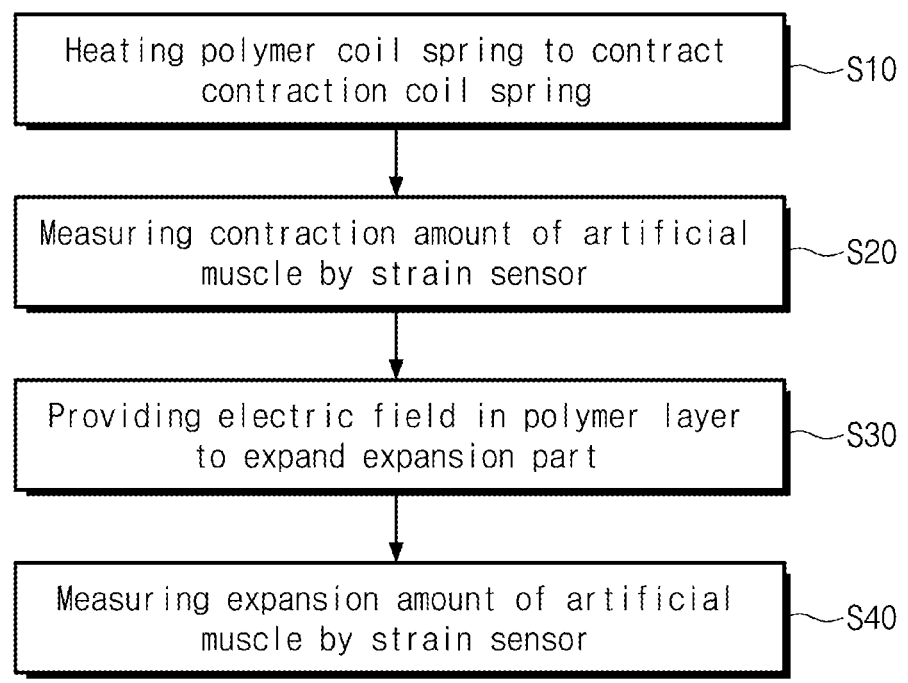
FIG. 6 is a flowchart for explaining a method for operating an artificial muscle according to exemplary embodiments of the inventive concept.
Figure 7:
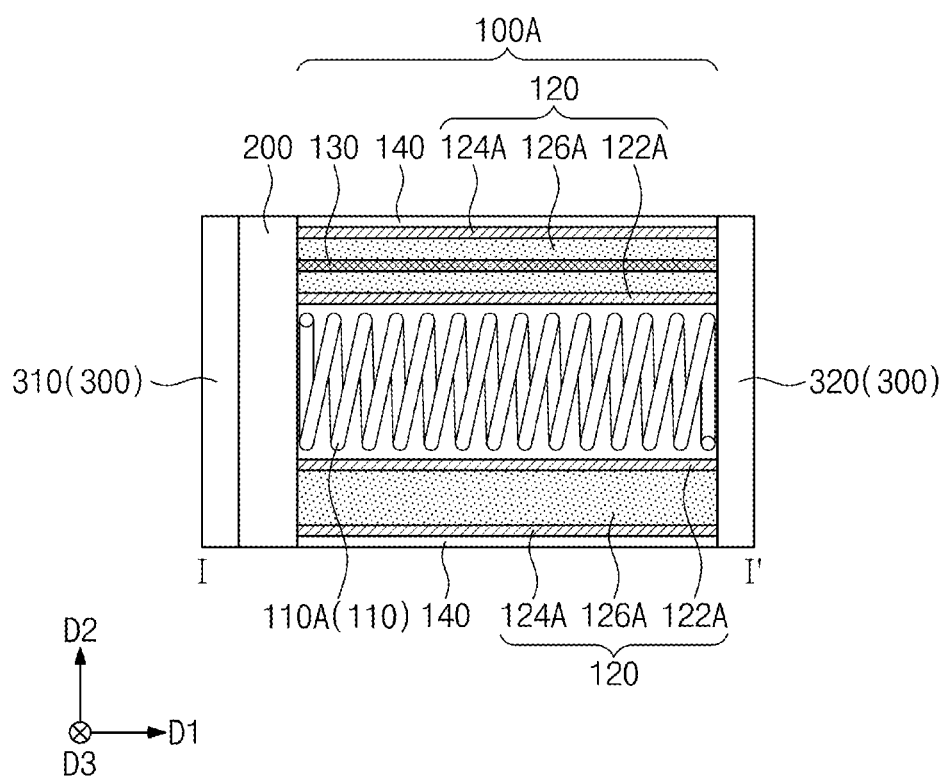
FIG. 7 is a cross-sectional view corresponding to the line I-I' of FIG. 2 for explaining a state in which an artificial muscle is contracted according to exemplary embodiments of the inventive concept.
Figure 8:
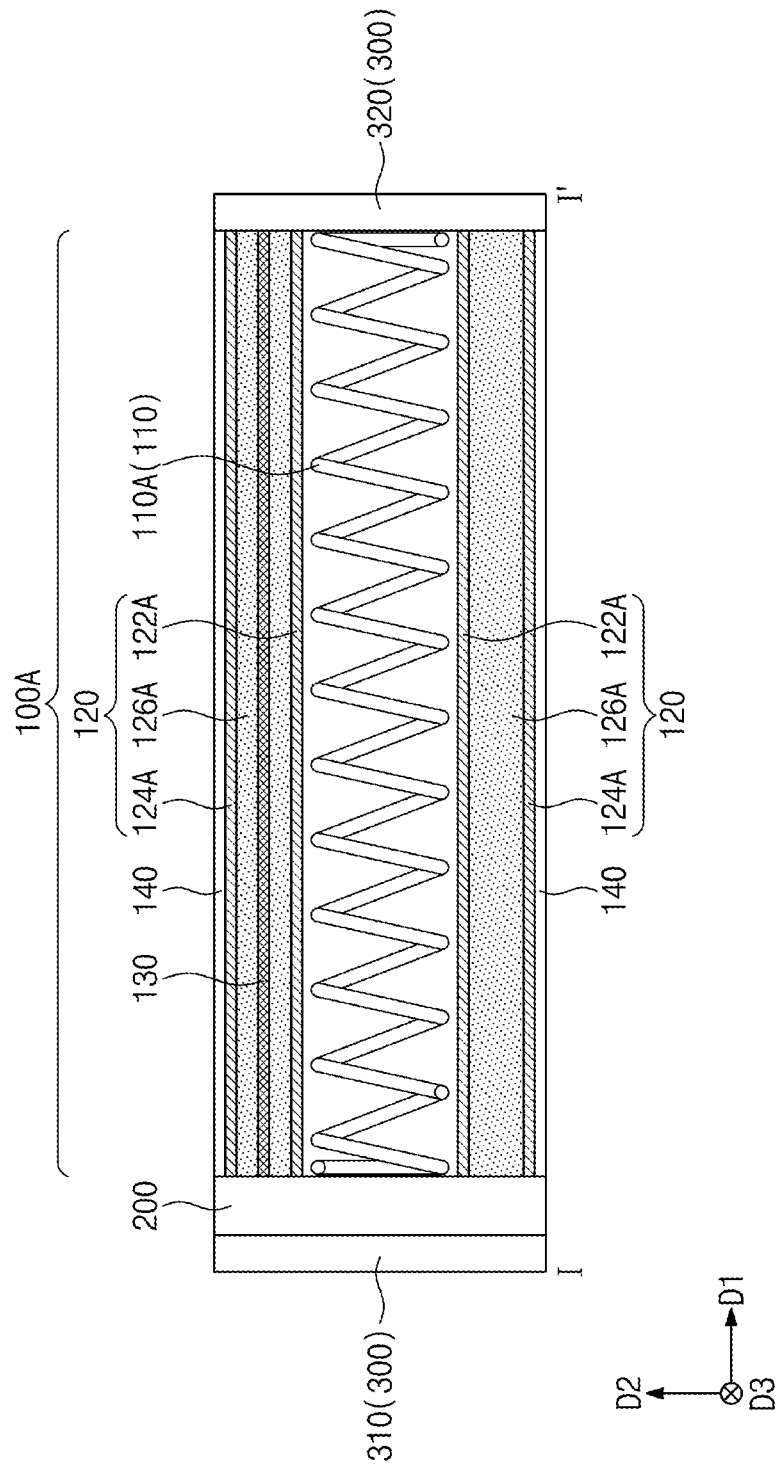
FIG. 8 is a cross-sectional view corresponding to the line I-I' of FIG. 2 for explaining a state in which an artificial muscle is expanded according to exemplary embodiments of the inventive concept.

FIG. 6 is a flowchart for explaining a method for operating an artificial muscle according to exemplary embodiments of the inventive concept. FIG. 7 is a cross-sectional view corresponding to the line I-I' of FIG. 2 for explaining a state in which an artificial muscle is contracted according to exemplary embodiments of the inventive concept. FIG. 8 is a cross-sectional view corresponding to the line I-I' of FIG. 2 for explaining a state in which an artificial muscle is expanded according to exemplary embodiments of the inventive concept. For concise description, the substantially same contents as those described with reference to FIGS. 2 to 4 will not be provided.

Referring to FIGS. 6 and 7, in operation S10, as the polymer coil spring 112 may be heated, the first contraction coil spring 110A may be contracted in the first direction D1.

The heating of the polymer coil spring 112 may include providing a current into the heating part 114 through the control unit 200 to generate heat from the heating part 114. The polymer coil spring 112 may be contracted by being heated by the heating part 114. When the current flows through the heating part 114, the heating part 114 may generate joule heat. The heating part 114 may include a material having high electric resistance. The control unit 200 may adjust an amount of the current flowing through the heating part 114 to control an amount of heat generated from the heating part 114.

As the first contraction coil spring 110A is contracted, a distance between the first and second stress transmission parts 310 and 320 may decrease. The first and second stress transmission parts 310 and 320 may push the expansion part 120 and the strain sensor 130. Accordingly, the expansion part 120 and the strain sensor 130 may be contracted in the first direction D1. According to an embodiment of the inventive concept, the artificial muscle 10 may be contracted in the first direction D1 by the first contraction coil spring 110A.

The strain sensor 130 may have the substantially same contraction amount as that of the artificial muscle 10. In operation S20, a contraction amount of the artificial muscle 10 may be measured by the strain sensor 130. For example, when the artificial muscle 10 is contracted, the strain sensor 130 may decrease in electric resistance. The control unit 200 may measure a variation amount of the electric resistance to generate data regarding the contraction amount of the artificial muscle 10.

Referring to FIGS. 6 and 8, in operation S30, as an electric field is provided in the polymer layer 126A, the expansion part 120 may be expanded in the first direction D1 and a direction opposite thereto. The providing of the electric field in the polymer layer 126A may include respectively applying different voltages to the first and second electrodes 122A and 124A through the control unit 200. For example, when the voltage applied to the first electrode 122A is greater than the voltage applied to the second electrode 124A, an electric field heading from the first electrode 122A to the second electrode 124A may be generated. Since the polymer layer 126A is expanded in a direction perpendicular to the electric field, the polymer layer 126A may be expanded in the first direction D1 and the direction opposite thereto.

As the expansion part 120 is expanded in the first direction D1 and the direction opposite thereto, the distance between the first and second stress transmission parts 310 and 320 may increase. The first and second stress transmission parts 310 and 320 may pull the first contraction coil spring 110A and the strain sensor 130. Accordingly, the first contraction coil spring 110A and the strain sensor 130 may be expanded in the first direction D1 and the direction opposite thereto. According to an embodiment of the inventive concept, the artificial muscle 10 may be expanded by the expansion part 120 in the first direction D1 and the direction opposite thereto.

The strain sensor 130 may have the substantially same expansion amount as that of the artificial muscle 10. In operation S40, an expansion amount of the artificial muscle 10 may be measured by the strain sensor 130. For example, when the artificial muscle 10 is expanded, the strain sensor 130 may increase in electric resistance. The control unit 200 may receive the data regarding a variation amount of the electric resistance to generate data regarding the expansion amount of the artificial muscle 10.

When the artificial muscle 10 is contracted, the expansion part 120 may not be operated. That is, the control unit 200 may not apply voltages to the first and second electrodes 122A and 124A. The expansion part 120 according to an embodiment of the inventive concept may not prevent the contraction movement of the artificial muscle 10. When the artificial muscle 10 is expanded, the first contraction coil spring 110A may not be operated. That is, the control unit 200 may not provide a current to the heating part 114. The first contraction coil spring 110A according to an embodiment of the inventive concept may not prevent the expansion movement of the artificial muscle 10.

The control unit 200 may adjust an amount of the current provided to the heating part 114 to control a contraction speed of the first contraction coil spring 110A. The control unit 200 may adjust a voltage difference between the first and second electrodes 122A and 124A to control an expansion speed of the expansion part 120. The artificial muscle 10 according to an embodiment of the inventive concept may have the contraction speed and the expansion speed, which are easily controlled.

Figure 9:
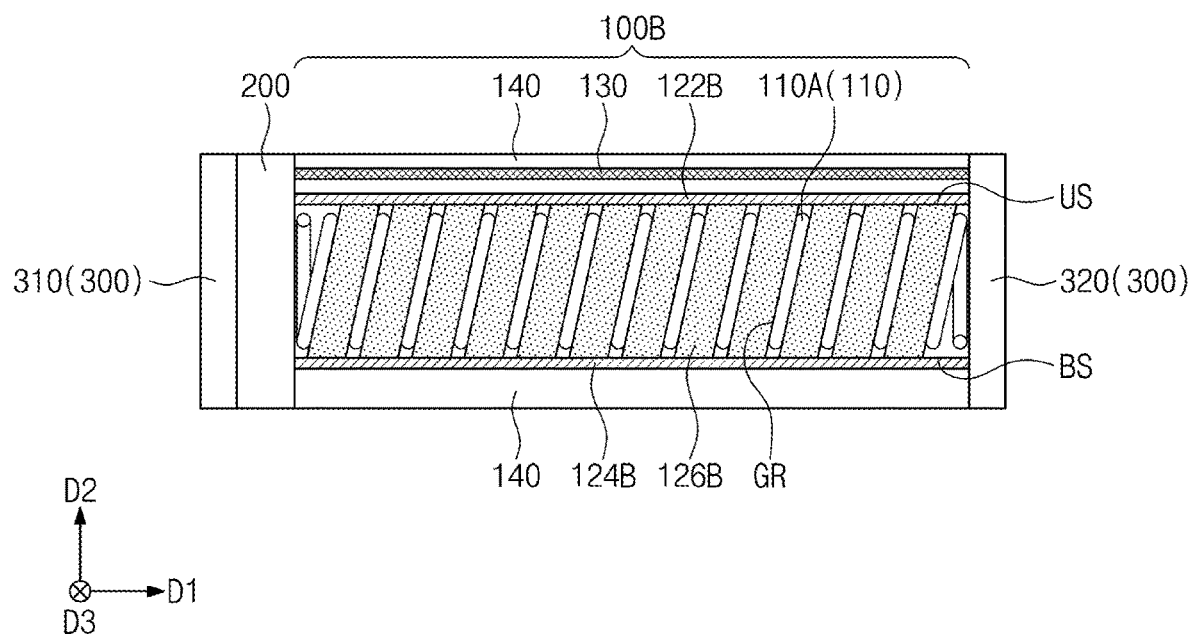
FIG. 9 is a cross-sectional view corresponding to the line I-I' of FIG. 2 of an artificial muscle according to exemplary embodiments of the inventive concept.

FIG. 9 is a cross-sectional view corresponding to the line I-I' of FIG. 2 of an artificial muscle according to exemplary embodiments of the inventive concept. For concise description, the substantially same contents as those described with reference to FIGS. 2 to 4 will not be provided.

Referring to FIGS. 2 and 9, an artificial muscle 12 including first and second stress transmission parts 310 and 320, a control unit 200, and a second body part 100B may be provided. The first and second stress transmission parts 310 and 320 and the control unit 200 may be substantially the same as the first and second stress transmission parts 310 and 320 and the control unit 200 described with reference to FIGS. 2 to 4.

The second body part 100B may include a first contraction coil spring 110A, polymer disks 126B, third and fourth electrodes 122B and 124B, a housing 140, and a strain sensor 130. The first contraction coil spring 110A may be substantially the same as the first contraction coil spring 110A described with reference to FIGS. 2 to 4.

The polymer disks 126B may be respectively inserted into gap regions GR of the first contraction coil spring 110A. The gap regions GR may indicate gaps defined in the first contraction coil spring 110A. For example, each of the gap regions GR may be a gap between a pair of wound wires adjacent to each other of the first contraction coil spring 110A. For example, when the first contraction coil spring 110A is completely contracted, the first contraction coil spring 110A may not include the gap regions GR. As the first contraction coil spring 110A is expanded, each of the gap regions GR gradually increases. The polymer disks 126B may be respectively filled into the gap regions GR. Both side surfaces of each of the polymer disks 126B in the first direction D1 may directly contact the first contraction coil spring 110A. The polymer disks 126B may include the substantially same material as that of the polymer layer 126A described with reference to FIGS. 2 to 4.

The third and fourth electrodes 122B and 124B may be respectively provided on a top surface US and a bottom surface BS of each of the polymer disks 126B. Each of the third and fourth electrodes 122B and 124B may extend in the first direction D1. The third and fourth electrodes 122B and 124B may be respectively electrically connected to the top surface US and the bottom surface BS of each of the polymer disks 126B. The third and fourth electrodes 122B and 124B may respectively directly contact the top surface US and the bottom surface BS of each of the polymer disks 126B. The third and fourth electrodes 122B and 124B may be electrically separated from each other. The third and fourth electrodes 122B and 124B may be spaced apart from each other.

When voltages different from each other are respectively applied to the third and fourth electrodes 122B and 124B, an electric field may be provided therebetween. The polymer disks 126B may be expanded in a direction perpendicular to the electric field by the electric field. As voltages different from each other are respectively applied to the third and fourth electrodes 122B and 124B, the polymer disks 126B may be expanded in the first direction D1 and the direction opposite thereto. The control unit 200 according to an embodiment of the inventive concept may adjust voltages applied to the third and fourth electrodes 122B and 124B to control an expansion speed of the polymer disks 126B.

The housing 140 may surround the first contraction coil spring 110A and the third and fourth electrodes 122B and 124B. For example, the housing 140 may be a tube accommodating the first contraction coil spring 110A and the third and fourth electrodes 122B and 124B therein. The housing 140 may extend in the first direction D1. The housing 140 may include a flexible electric insulation material.

The strain sensor 130 may pass through the housing 140 and be connected to the control unit 200 and the second stress transmission part 320. For example, the strain sensor 130 may extend in the first direction D1. The strain sensor 130 may be substantially the same as the strain sensor 130 described with reference to FIGS. 2 to 4 except for a position thereof.

The artificial muscle 12 according to an embodiment of the inventive concept may have the contraction speed and the expansion speed, which are easily controlled.

Figure 10:
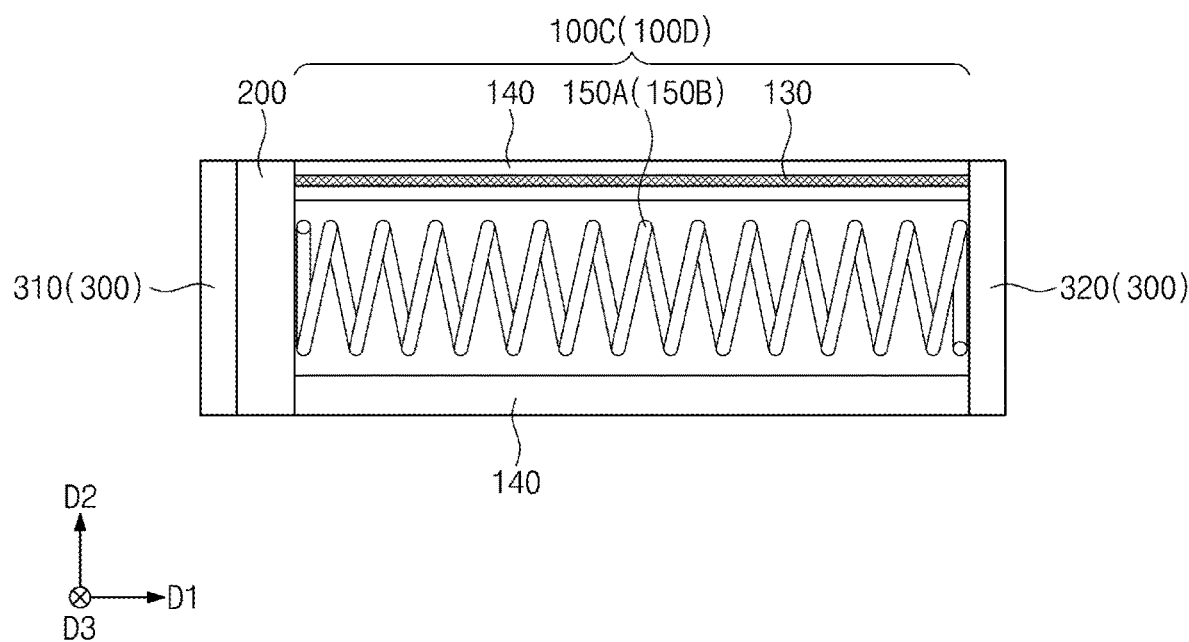
FIG. 10 is a cross-sectional view corresponding to the line I-I' of FIG. 2 of an artificial muscle according to exemplary embodiments of the inventive concept.
Figure 11:
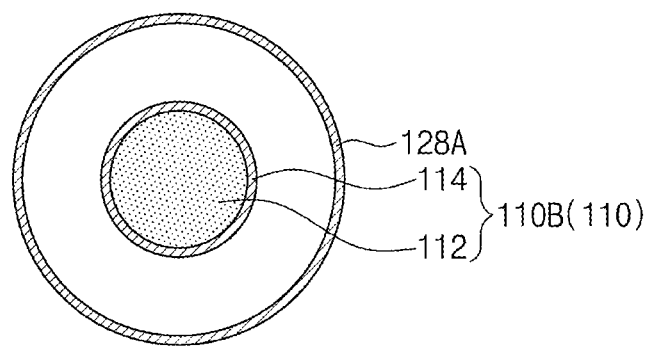
FIG. 11 is a cross-sectional view of a first modified coil spring of FIG. 10.

FIG. 10 is a cross-sectional view corresponding to the line I-I' of FIG. 2 of an artificial muscle according to exemplary embodiments of the inventive concept. FIG. 11 is a cross-sectional view of a first modified coil spring of FIG. 10. For concise description, the substantially same contents as those described with reference to FIGS. 2 to 4 will not be provided.

Referring to FIGS. 2, 10, and 11, an artificial muscle 14 including first and second stress transmission parts 310 and 320, a control unit 200, and a third body part 100C may be provided. The first and second stress transmission parts 310 and 320 and the control unit 200 may be substantially the same as the first and second stress transmission parts 310 and 320 and the control unit 200 described with reference to FIGS. 2 to 4.

The third body part 100C may include a first modified coil spring 150A, a housing 140 surrounding the first modified coil spring 150A, and a strain sensor 130. The first modified coil spring 150A may include a second contraction coil spring 110B and a first elastic coil spring 128A surrounding the second contraction coil spring 110B. The second contraction coil spring 110B may include a polymer coil spring 112 and a heating part 114. The polymer coil spring 112 and the heating part 114 may be substantially the same as the polymer coil spring 112 and the heating part 114 described with reference to FIGS. 2 to 4. Unlike the first contraction coil spring 110A, the second contraction coil spring 110B does not include an outer cover. The first elastic coil spring 128A may be radially spaced apart from the second contraction coil spring 110B. The first elastic coil spring 128A may have elasticity (or resilience) for being restored to an initial state again when deformed (contracted or expanded) from the initial state. For example, the first elastic coil spring 128A may include a metal spring or a non-metal spring having excellent thermal conductivity and high rigidity. The first elastic coil spring 128A may correspond to the expansion part 120 described with reference to FIG. 1. When the polymer coil spring 112 is contracted in the first direction D1, the first elastic coil spring 128A may be also contracted in the first direction D1. Since the first elastic coil spring 128A has elasticity (or resilience), the first elastic coil spring 128A may be expanded in the first direction D1. The artificial muscle 14 may be expanded in the first direction D1 by the first elastic coil spring 128A. According to exemplary embodiments, a refrigerant may be provided between the first elastic coil spring 128A and the heating part 114. The housing 140 may include a flexible material.

According to an embodiment of the inventive concept, the first modified coil spring 150A may have both functions of the contraction part and the expansion part. Since an additional expansion part is not demanded, the artificial muscle 14 may be minimized in size.

Figure 12:
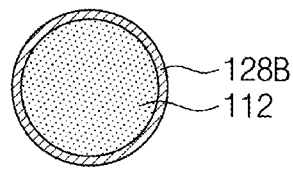
FIG. 12 is a cross-sectional view of a second modified coil spring of FIG. 10.

FIG. 12 is a cross-sectional view of a second modified coil spring of FIG. 10. For concise description, the substantially same contents as those described with reference to FIGS. 10 to 11 will not be provided.

Referring to FIGS. 2, 10, and 12, an artificial muscle 16 including first and second stress transmission parts 310 and 320, a control unit 200, and a fourth body part 100D may be provided. The first and second stress transmission parts 310 and 320 and the control unit 200 may be substantially the same as the first and second stress transmission parts 310 and 320 and the control unit 200 described with reference to FIGS. 2 to 4.

The fourth body part 100D may include a second modified coil spring 150B and a housing 140 surrounding the second modified coil spring 150B. The housing 140 may be substantially the same as the housing 140 described with reference to FIG. 11. The second modified coil spring 150B may include a polymer coil spring 112 and a second elastic coil spring 128B covering a surface of the polymer coil spring 112. The polymer coil spring 112 may be substantially the same as the polymer coil spring 112 described with reference to FIGS. 2 to 4.

The second elastic coil spring 128B may has the functions of the heating part 114 and the expansion part 120 described with reference to FIG. 1. The second elastic coil spring 128B may heat the polymer coil spring 112. The second elastic coil spring 128B may include a material having elasticity and high resistance. When a current flows through the second elastic coil spring 128B, joule heat may be generated from the second elastic contraction coil spring 128B. The current may be provided to the second coil spring 128B through the control unit 200. The joule heat may be provided to the polymer coil spring 112 to contract the polymer coil spring 112 in the first direction D1 and the direction opposite thereto.

When the polymer coil spring 112 is contracted, the second coil spring 128B may be also contracted. Since the second coil spring 128B has a resilient force, the second coil spring 128B may be expanded in the first direction D1 and the direction opposite thereto. The artificial muscle 16 may be expanded in the first direction D1 and the direction opposite thereto in virtue of the second elastic coil spring 128B.

The second modified coil spring 150B according to an embodiment of the inventive concept may have both functions of the contraction part and the expansion part at the same time. Since an additional expansion part is not demanded, the artificial muscle 16 may be minimized in size.

According to the embodiment of the inventive concept, the artificial muscle may have the improved contraction speed and expansion speed.

According to the embodiment of the inventive concept, the contraction operation and expansion operation of the artificial muscle may be easily controlled.

However, the effects of the embodiments of the inventive concept are not limited to the above description.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An artificial muscle comprising:
a first stress transmission part and a second stress transmission part, which are spaced apart from each other in a first direction;
a contraction coil spring provided between the first and second stress transmission parts to pull the first and second stress transmission parts; and
an expansion part provided between the first and second stress transmission parts to push the first and second stress transmission parts,
wherein the contraction coil spring has a shape of a spring progressing in the first direction, and
the contraction coil spring is contracted by heat.

2. The artificial muscle of claim 1, wherein the contraction coil spring comprises:
a polymer coil spring; and
a heating part covering a surface of the polymer coil spring, and
the heating part heats the polymer coil spring, and
the polymer coil spring is contracted in the first direction by the heating.

3. The artificial muscle of claim 2, wherein the contraction coil spring further comprises an outer cover that is radially spaced apart from the heating part, and
a space through which a refrigerant flows is provided between the outer cover and the heating part.

4. The artificial muscle of claim 1, further comprising a strain sensor provided between the first and second strain transmission parts,
wherein the strain sensor measures a variation amount of a distance between the first and second strain transmission parts.

5. The artificial muscle of claim 1, wherein the expansion part comprises:
a polymer layer surrounding the contraction coil spring; and
a first electrode and a second electrode, which are respectively provided on an inner surface and an outer surface of the polymer layer, and
voltages different from each other are respectively applied to the first and second electrodes to provide an electric field in the polymer layer, and
the polymer layer is expanded in the first direction by the electric field.

6. The artificial muscle of claim 5, wherein the expansion part further comprises a housing provided on the second electrode, and
the housing comprises an insulation material.

7. The artificial muscle of claim 1, wherein the expansion part comprises:
a polymer disk provided in a gap region of the contraction coil spring; and
a third electrode and a fourth electrode, which are respectively provided on a top surface and a bottom surface of the polymer disk, and
the gap region is a gap between a pair of wound wires disposed adjacent to each other of the contraction coil spring,
voltages different from each other are respectively applied to the third and fourth electrodes to provide an electric field in the polymer disk, and
the polymer disk is expanded in the first direction by the electric field.

8. The artificial muscle of claim 7, wherein each of the polymer disk and the gap region is provided in plurality,
the plurality of polymer disks are respectively provided in the plurality of gap regions, and
the plurality of polymer disks are electrically connected to the third and fourth electrodes.

9. The artificial muscle of claim 1, wherein the expansion part comprises an elastic coil spring having a shape of a spring progressing in the first direction, and
the contraction coil spring is provided in the elastic coil spring.

10. The artificial muscle of claim 9, wherein the elastic coil spring is radially spaced apart from the contraction coil spring, and
a space through which a refrigerant flows is provided between the elastic coil spring and the contraction coil spring.

11. The artificial muscle of claim 9, wherein the elastic coil spring covers a surface of the contraction coil spring.

12. The artificial muscle of claim 11, wherein the contraction coil spring comprises a polymer coil spring,
the elastic coil spring heats the polymer coil spring, and
the polymer coil spring is contracted in the first direction by the heating.

* * * * *